No. 881,570. PATENTED MAR. 10, 1908.
G. GIOVANNA.
APPARATUS FOR PREPARING EXTRACTS.
APPLICATION FILED JAN. 24, 1905.
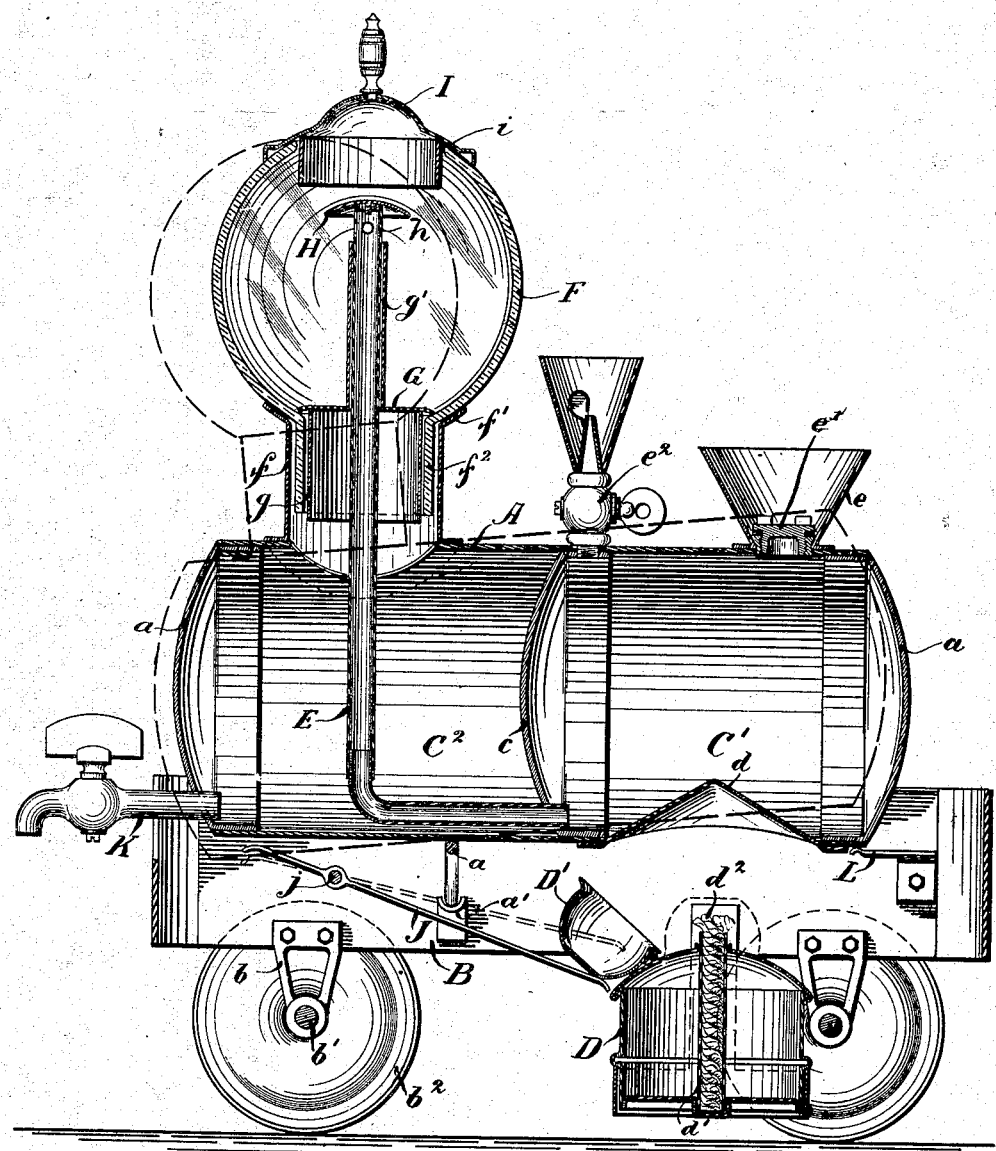
Witnesses
Wm. G. Bergman
V. E. Nichols
George Giovanna, Inventor
By his Attorneys Griffin & Bernhard

UNITED STATES PATENT OFFICE.

GEORGE GIOVANNA, OF NEW YORK, N. Y.

APPARATUS FOR PREPARING EXTRACTS.

No. 881,570.  Specification of Letters Patent.  Patented March 10, 1908.

Application filed January 24, 1905. Serial No. 242,527.

*To all whom it may concern:*

Be it known that I, GEORGE GIOVANNA, a citizen of the United States, residing at the city of New York, borough of Manhattan, in the county of New York and State of New York, have invented certain new and useful Improvements in Apparatus for Preparing Extracts, of which the following is a specification.

My invention relates to apparatus for preparing extracts, the same relating more especially to structures of that kind wherein heat is used for boiling a liquid which is brought into contact with a charge of material for the purpose of producing an infusion.

One practical embodiment of the invention consists in a portable structure for preparing beverages, such as an infusion of coffee, tea or the like, although it should be understood that the invention is not confined to this specific use.

The object of the invention is to automatically cut off the supply of heat upon the production of a predetermined or desired quantity of a liquid extract or infusion, thereby effecting economy in the consumption of the fuel and obviating attention to the operation of the apparatus.

Reference is to be had to the accompanying drawings, wherein the figure represents a vertical sectional elevation, taken longitudinally through one embodiment of the invention.

As shown by the drawings, my invention is embodied as a portable urn adapted for use by families, hotels, restaurants, or the like. The apparatus is shown as having a tank A, which may be made of metal, and in the form of a cylinder, the ends of which are closed by suitable heads $a$. I do nor desire, however, to confine myself strictly to this particular form of vessel, nor to metal in the construction of the vessel, because the shape of the vessel may be modified at will and the other materials may be used in its construction. In some instances, I may use a porcelain vessel, which may be covered by a metallic jacket, but as this is an obvious expedient, I have not thought it necessary to illustrate the same in the drawing.

The tank A is arranged in a horizontal position, and it is mounted on a suitable base B in a way to have a tilting movement thereon. The base may be stationary or movable, but as shown, the base is provided with suitable bearings $b$, for axles $b'$, which are equipped with carrying wheels $b^2$. The particular form of the base, however, may be modified, or changed at pleasure. As one means for pivotally mounting the vessel on the base, I employ a cranked axle $a$, adapted to work in bearings $a'$ on the base, said vessel A being tiltable, as indicated by full and dotted lines in the drawings.

The interior of the tiltable vessel is divided by a partition $c$, into a liquid chamber $C'$, and an infusion chamber $C^2$.

The bottom of the tank A below the liquid chamber $C'$, is deflected upwardly as at $d$, and below this deflected part of said tank is arranged a heater D, the latter being supported or carried by the base B. Said heater is represented as a vapor lamp having a wick tube $d'$, in which is arranged a wick $d^2$. The flame from the vapor lamp is directed against the deflected part $d$ of the vessel, so as to heat the liquid in the compartment $C'$. The heater is adapted to be cut off or thrown out of service by any suitable form of movable closure, but as herein represented, this cut-off is embodied in the form of a pivoted cover D, which is adapted to close over the wick, and thereby extinguish the flame, so as to cut the heater out of service.

Water or other liquid may be introduced conveniently into the compartment $C'$ through a funnel $e$, which may be securely closed by any suitable form of closure $e'$. The steam pressure in the chamber $C'$ may be reduced by a suitable form of automatic vent, such as $e^2$, having communication with said chamber.

To prepare the infusion, I employ a device which I term an extractor, the same having communication with the infusion chamber $C^2$ of the vessel, and also having communication with the liquid chamber $C'$, this last mentioned communication being established by a pipe E. As shown by the drawing, the feed pipe consists of two lengths arranged within the chamber $C^2$, and extending into the extractor. The horizontal length of the feed pipe extends through the partition $c$, to have communication with the chamber $C'$, whereas the vertical length pipe E extends beyond the chamber $C^2$, and into the extractor.

On the upper side of the tank A is a collar $f$, having communication with the chamber $C^2$, and the upper part of this collar is provided with a flange which constitutes a seat for the extractor vessel F. This extractor vessel may be made of glass, porcelain, a porous material, or any other suitable substance, and at its lower part said vessel has a hollow neck portion $f^2$, which is fitted snugly within the upstanding neck $f$ of the tiltable vessel A. Within the lower part of the extractor vessel F is a foraminous bottom G, on which is adapted to be placed the charge of material from which the extract is to be prepared. The foraminous bottom is held in place by a depending flange $g$, which fits within the hollow neck $f^2$, and from the middle part of this bottom G rises a guide tube $g'$, the latter extending upwardly into the extractor vessel F. The vertical length of the feed pipe E passes through the necks $f, f^2$, and the tube $g'$, the upper extremity of said feed pipe terminating above said tube $g'$. A cap H is screwed or otherwise detachably connected to the upper protruding end of the feed pipe and in this feed pipe is provided one or more exit openings $h$, whereby the liquid supplied to the feed pipe by the chamber C' finds its exit through the openings $h$ into the vessel of the extractor. The vessel F is furthermore provided in its crown with an opening $i$, which enables the charge of material to be readily introduced into the extractor, and this opening is normally closed by a suitable form of cover I.

The extractor or percolator is adapted to be removed bodily from the short tube or nipple $f$ on the vessel A, because the receptacle F and the perforated bottom G may be readily withdrawn from the tube or nipple $f$, it only being necessary to remove the cap H from the feed pipe E, when it is desired to withdraw the bottom G, and its tube $g'$ from the vertical length of said feed E.

The feed pipe extends through the extract chamber $C^2$ of the apparatus, thereby housing said feed pipe within a heated chamber of the apparatus, and preventing the liquid contained in said pipe from cooling by contact with the external atmosphere during the operation of transferring the liquid from the water chamber C' into the receptacle F of the percolator.

Another advantage of my invention is that the vertical branch of the feed pipe extends upwardly from the extract chamber into the receptacle F of the percolator, the arrangement being such that the percolator and its bottom G may be withdrawn from the vessel A, without disturbing or interfering with the pipe E, whereby provision is made for easily and quickly cleaning the apparatus.

J designates a lever, which is arranged within the base and below the tiltable vessel A. This lever is hung or supported intermediate of its length by a rod $j$, which is supported by the base B. The lever is hung to provide two arms, one of which is longer than the other, and as shown, the long arm of said lever fits below the closure D' of the heater when said closure is swung to a position where the wick is uncovered. The short arm of the lever terminates close to the tank A, and said lever is held in an inclined position by the long arm thereof being heavier than the short arm.

The infusion stored in the chamber $C^2$ is adapted to be drawn therefrom at will through a suitable draw-off cock or faucet K. It will be observed that the extractor is mounted on the vessel A, near the end portion thereof, so that the extractor is movable bodily with said vessel in the tilting adjustment of the latter, and in order that the vessel may take a horizontal position, I pivotally mount it eccentrically on the base. The vessel is adapted to rest at one end on a suitable shelf or ledge L.

The operation of the apparatus may be described as follows: A suitable quantity of liquid is introduced into the chamber C', and the closure $e'$ is applied to the filling opening. The cover I is removed from the vessel F, and a suitable quantity of tea or coffee, or other material, is placed in the vessel F, the cover I being replaced. The cut-off D' of the heater is now moved to the open position shown by the drawing, in which position the cut-off rests on the free end of the operating lever J. A match or taper is now applied to the wick $d^2$, and the heat is directed against the bottom $d$ for the purpose of heating the liquid in the chamber C'. When the steam in the chamber attains the desired pressure, the water is forced through the pipe E, and is discharged through the openings $h$, upon the material contained in the vessel F. An infusion is prepared by bringing the hot liquid into contact with the charge of material contained in the vessel F, and the infusion is free to flow through the bottom G, and the flange $g$, into the chamber $C^2$. This operation continues until the weight of the liquid in the chamber C' is over-balanced by the quantity of infusion or extract stored in the chamber $C^2$. When the desired quantity of extract is present in said chamber $C^2$, the vessel A is tilted on the pivot $a$, to the position indicated by dotted lines in the drawing, whereupon the lever J is actuated by the movement of the vessel, so as to turn the cut-off D' to a closed position over the wick $d^2$. This automatically extinguishes the flame of the heater and throws the heater out of service, whereby the fuel is saved and the owner is relieved from the necessity of closely watching the apparatus.

It is evident that the extractor F and the bottom G may be readily detached from the vessel A. To do this the deflector H should be disconnected from the tube E, and the bottom G with the tube $g'$, may then be slipped over the upper part of the feed pipe E. The vessel F can now be detached and all the parts thereof are separated, so that they may be easily cleansed and dried, before they are replaced to resume the operation.

Changes in the form, size, proportion, and minor details in construction may be made without departing from the spirit of the invention or sacrificing any of the advantages thereof, and I, therefore, reserve the right to make such alterations and modifications as fairly fall within the scope of my invention.

Having thus described my invention, what I claim as new and desire to secure by Letters Patent is:—

1. In a domestic coffee urn, a hot-water receptacle, means for heating said receptacle, a percolating chamber, having an open bottom and a depending tubular flanged outlet, a pipe communicating with said receptacle and said percolating chamber for delivering hot water to the latter chamber, a removable distributer mounted on the upper end of said pipe, a tube within said percolating chamber and surrounding that portion of the water pipe located in said percolating chamber, a perforated member secured to the lower end of said tube and adapted to form a support for the coffee, said tube and the perforated member being separate from the percolating chamber and adapted to be removed therefrom without disturbing the percolating chamber, and a coffee extract chamber communicating with said percolating chamber, whereby the coffee extract may pass from the percolating chamber to said extract chamber.

2. In a domestic coffee urn, a hot-water receptacle, means for heating said receptacle, a percolating chamber, having an open bottom and a depending tubular flanged outlet, a pipe communicating with said receptacle and said percolating chamber for delivering hot water to the latter chamber, a tube within said percolating chamber and surrounding that portion of the water pipe located in said percolating chamber, a perforated member secured to the lower end of said tube and adapted to form a support for the coffee, said tube and the perforated member being separate from the percolating chamber and adapted to be removed therefrom without disturbing the percolating chamber, a tubular flange depending from said perforated member and extending within the aforesaid tubular flanged outlet, and a coffee extract chamber communicating with said percolating chamber, said extract chamber having a constricted inlet, in the form of an upwardly extending tube flanged at its upper end and forming a seat for the percolating chamber.

In testimony whereof I have signed my name to this specification in the presence of two subscribing witnesses.

GEORGE GIOVANNA.

Witnesses:
  JAS. H. GRIFFIN,
  H. I. BERNHARD.